(12) United States Patent
Honma et al.

(10) Patent No.: US 7,738,726 B2
(45) Date of Patent: Jun. 15, 2010

(54) BLOCK DISTORTION REDUCTION APPARATUS

(75) Inventors: Kimiyasu Honma, Kanagawa (JP); Mitsuaki Shiraga, Chiba (JP); Hiroshi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 746 days.

(21) Appl. No.: 10/868,836

(22) Filed: Jun. 17, 2004

(65) Prior Publication Data

US 2005/0018922 A1 Jan. 27, 2005

(30) Foreign Application Priority Data

Jun. 25, 2003 (JP) .............................. 2003-181544

(51) Int. Cl.
*G06K 9/40* (2006.01)

(52) U.S. Cl. .................. 382/268; 382/239; 382/275; 382/232; 375/240; 348/405

(58) Field of Classification Search ......... 382/268–275; 375/240; 348/405; 250/370
See application file for complete search history.

(56) References Cited

U.S. PATENT DOCUMENTS

| | | | | |
|---|---|---|---|---|
| 5,325,125 A | * | 6/1994 | Naimpally et al. | 375/240.12 |
| 5,742,060 A | * | 4/1998 | Ashburn | 250/370.09 |
| 5,847,764 A | * | 12/1998 | Murakami | 375/240.16 |
| 5,926,573 A | * | 7/1999 | Kim et al. | 382/239 |
| 5,969,777 A | * | 10/1999 | Mawatari | 375/240.26 |
| 6,434,275 B1 | * | 8/2002 | Fukuda et al. | 382/275 |
| 6,721,362 B2 | * | 4/2004 | Lin et al. | 375/240.27 |
| 6,748,113 B1 | * | 6/2004 | Kondo et al. | 382/232 |
| 6,823,009 B1 | * | 11/2004 | Baina et al. | 375/240.12 |
| 6,825,886 B2 | * | 11/2004 | Kobayashi et al. | 348/405.1 |

FOREIGN PATENT DOCUMENTS

| | | | |
|---|---|---|---|
| JP | 04-000970 | | 1/1992 |
| JP | 04185169 A | * | 7/1992 |
| JP | 07236160 A | * | 9/1995 |
| JP | 07-322245 | | 12/1995 |
| JP | 10-051782 | | 2/1998 |
| JP | 11-075193 | | 3/1999 |
| JP | 11-205801 | | 7/1999 |
| JP | 11-215500 | | 8/1999 |
| JP | 11-275584 | | 10/1999 |
| JP | 2001-346208 | | 12/2001 |
| WO | WO 98/54892 | | 12/1998 |

* cited by examiner

*Primary Examiner*—Samir A Ahmed
*Assistant Examiner*—Tsung-Yin Tsai
(74) *Attorney, Agent, or Firm*—Oblon, Spivak, McClelland, Maier & Neustadt, L.L.P.

(57) ABSTRACT

A block distortion reduction apparatus, enabling easy processing by a small-sized circuit configuration and enabling generation of block distortion reduction parameters by any area unit inside a frame, which averages encoding coefficients in a macroblock units to obtain a DCT parameter, calculates a DMV parameter of differential motion vectors by weighting in accordance with the encoding mode of the macroblock unit, and determines a correction value for the block distortion reduction based on these parameters.

5 Claims, 11 Drawing Sheets

| CODEC MODE | PICTURE STRUCTURE | PREDICTION TYPE | MB MODE | NUMBER OF DIFFERENTIAL VECTORS |
|---|---|---|---|---|
| MPEG1 | Frame | Frame | Forward | 2 |
| | | | Bi-dir | 2 |
| MPEG2 | Frame | Frame | Forward | 2 |
| | | | Bi-dir | 2 |
| | | Field | Forward | 4 |
| | | | Bi-dir | 4 |
| | | Dual Prime | Forward | 4 |
| | Field | 16x8 MC | Forward | 4 |
| | | | Bi-dir | 4 |
| | | Field | Forward | 2 |
| | | | Bi-dir | 2 |
| | | Dual Prime | Forward | 2 |
| MPEG4 | Frame | Frame | Inter | 2 |
| | | | Inter4MV | 8 |

| CODEC MODE | PICTURE STRUCTURE | PREDICTION TYPE | MB MODE | NUMBER OF DIFFERENTIAL VECTORS |
|---|---|---|---|---|
| MPEG1 | Frame | Frame | Forward | 2 |
| | | | Backward | 2 |
| | | | Bi-dir | 4 |
| MPEG2 | Frame | Frame | Forward | 2 |
| | | | Backward | 2 |
| | | | Bi-dir | 4 |
| | | Field | Forward | 4 |
| | | | Backward | 4 |
| | | | Bi-dir | 8 |
| | | Dual Prime | Forward | 4 |
| | Field | 16x8 MC | Forward | 4 |
| | | | Backward | 4 |
| | | | Bi-dir | 8 |
| | | Field | Forward | 2 |
| | | | Backward | 2 |
| | | | Bi-dir | 4 |
| | | Dual Prime | Forward | 2 |
| MPEG4 | Frame | Frame | Inter | 2 |
| | | | Inter4MV | 8 |

FIG. 5

| NUMBER OF VECTORS | WEIGHT |
|---|---|
| 8 | 1 |
| 4 | 2 |
| 2 | 4 |

WEIGHTING FOR DMV

FIG. 7

DECODE FRAME AREAS

PARAMETER CALCULATION AREAS

AREA0

AREA1

AREA2

AREA3

| MB1 | MB2 | MB3 |
|-----|-----|-----|
| MB4 | MB0 | MB5 |
| MB6 | MB7 | MB8 |

BLOCK DISTORTION REDUCTION APPARATUS

BACKGROUND OF THE INVENTION

1. Field of the Invention

The present invention relates to a block distortion reduction apparatus for reducing block distortion in blocking and encoding input data such as still image data and moving picture data.

2. Description of the Related Art

Block encoding such as Discrete Cosign Transform (DCT) encoding has been known as a method for effectively compressing and encoding still image data, moving picture data, etc. As an example of block encoding systems of image data, there can be mentioned the MPEG (Moving Picture Experts Group) combining DCT utilizing correlation in a frame, motion compensation utilizing correlation between frames, and Huffman encoding utilizing correlation of code strings.

In compressing or expanding image data etc. by such block encoding, block distortion (block noise) sometimes occurs. Distortion occurs easier as the compression ratio increases. That is, since DCT encoding etc. are performed in a closed space inside a block without considering correlation across block boundaries, the continuity of the data at block boundaries cannot be kept and therefore deviations in reproduced data values at boundaries with adjoining blocks are perceived as noise. This block distortion has a certain regularity, so is perceived more easily compared with general random noise and therefore is a major factor degrading image quality.

In order to reduce this block distortion, Japanese re-publication of PCT international WO98/54892 discloses a technique comprising detecting a parameter indicating difficulty of encoding from input image data, calculating a parameter required for judgment of block distortion from the input data, evaluating the block distortion based on the result of detection of the parameter indicating difficulty of encoding and the result of calculation of the above parameter, calculating a correction value to reduce the block distortion, and correcting the input data by the correction value in accordance with the result of evaluation of the block distortion.

Figure 11:
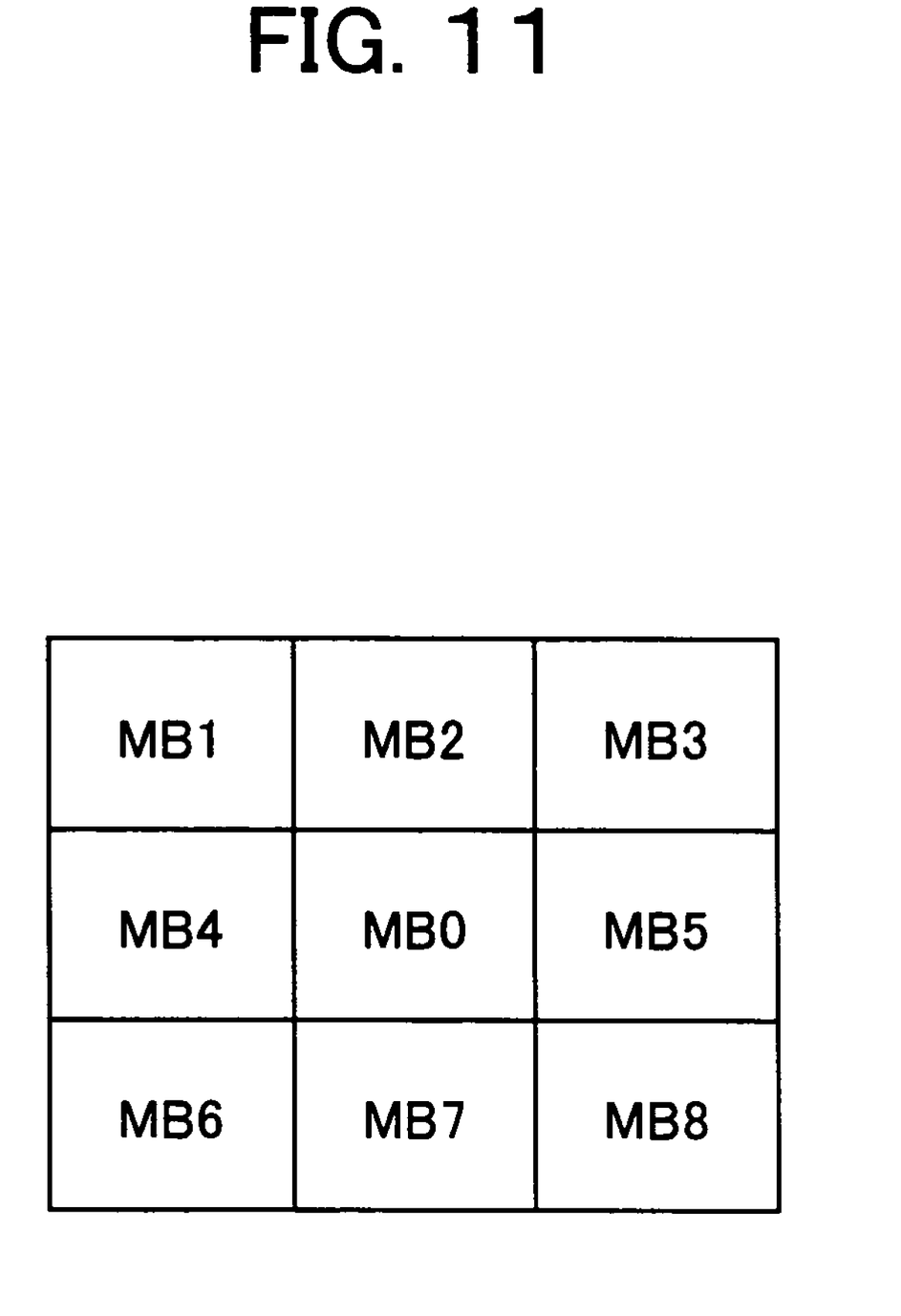
FIG. 11 is a view for explaining a method of parameter calculation according to the related art.

However, according to the method for calculating parameters required for evaluation of the block distortion from input data disclosed in the above publication, when macroblocks (MB) are arranged as shown in FIG. 11, a DCT coefficient and a differential motion vector are calculated for the macroblock MB0 for parameter calculation by the following equation:

$$MB0 = (MB0 + MB1 + MB2 + MB3 + MB4 + MB5 + MB6 + MB7 + MB8)/9$$

That is, in order to calculate the DCT coefficient and the differential motion vector DMV for the macroblock MB0, the adjoining macroblocks MB1 to MB8 are also considered. Therefore, the DCT coefficients and the differential motion vectors DMV of nine macroblocks in total are required to be buffered. Therefore, there is a disadvantage that the size of the circuit for the block distortion reduction becomes large.

Further, in an MPEG decoder, different numbers of differential motion vectors are output depending on the codec mode, picture structure, predictive type, and macroblock mode. However, no block distortion reduction apparatus handling such a variety of encoding modes has even been proposed. Therefore, a block distortion reduction apparatus not based on the encoding mode has been demanded.

SUMMARY OF THE INVENTION

A first object of the present invention is to provide a block distortion reduction apparatus enabling easy processing by a small-sized circuit configuration and enabling generation of block distortion reduction parameters by any area unit inside a frame.

A second object of the present invention is to provide a block distortion reduction apparatus enabling easy processing not based on the encoding mode.

To achieve the first object, a block distortion reduction apparatus according to the present invention has an encoding coefficient averaging means for calculating an average of encoding coefficients in a macroblock obtained by decoding of an image for both of the intra-mode and non-intra-mode of the macroblock modes; an encoding selecting means for selecting one encoding mode of the intra-mode and non-intra-mode; and a block distortion correcting means for correcting block distortion of the decoded image by the average of the encoding coefficients corresponding to the selected macroblock mode.

To achieve the second object, the block distortion reduction apparatus according to the present invention has further a differential vector integrating means for integrating differential vectors in a macroblock obtained by decoding the image and a weighting means for weighting the integration result of the differential vector integrating means in accordance with the encoding mode of the image; wherein the block distortion correcting means corrects block distortion of the decoded image by the integration result weighted by the weighting means.

BRIEF DESCRIPTION OF THE DRAWINGS

The above and other objects and features of the present invention will be described in more detail with reference to the accompanying drawings, in which.

DESCRIPTION OF THE PREFERRED EMBODIMENTS

Next, an embodiment of the present invention will be described with reference to the attached drawings.

Figure 1:
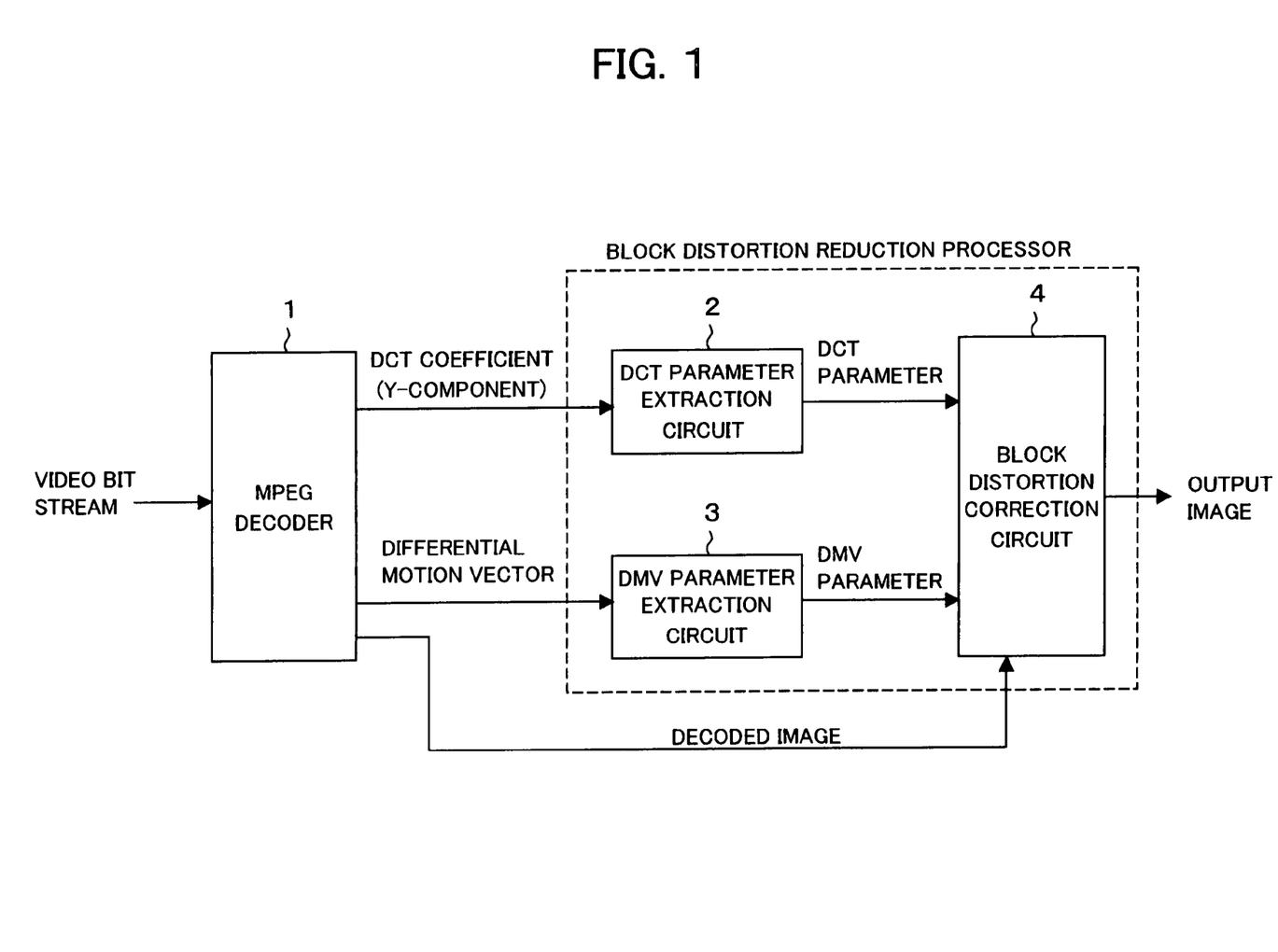
FIG. 1 is a view of the overall configuration of a block distortion reduction apparatus according to the present invention.

FIG. 1 is a view of the overall configuration of a block distortion reduction apparatus. The block distortion reduction apparatus shown in FIG. 1 is an example incorporating a MPEG decoder 1 for decoding an MPEG video bit stream. It is designed so as to reduce block distortion which occurs in image data decoded by this MPEG decoder.

The block distortion reduction apparatus has the MPEG decoder 1, a DCT parameter extraction circuit 2, a DMV parameter extraction circuit 3, and a block distortion correction circuit 4. The DCT parameter extraction circuit 2, the DMV parameter extraction circuit 3, and the block distortion correction circuit 4 constitute a block distortion reduction processor.

MPEG format image data is input into the MPEG decoder 1 as a video bit stream. The MPEG decoder 1 decodes this by inverse quantization and inverse DCT (discrete cosine transform). At this time, the MPEG decoder 1 decodes the stream in DCT block units comprised of a plurality of macroblocks (MB). The MPEG decoder 1 outputs a DCT coefficient and a differential motion vector DMV, obtained by the decoding, to the DCT parameter extraction circuit 2 and the DMV parameter extraction circuit 3, respectively.

The DCT parameter extraction circuit 2 generates a DCT parameter from the DCT coefficient obtained by the MPEG decoder 1 in accordance with the macroblock mode. The DMV parameter extraction circuit 3 generates a DMV parameter from the differential motion vector DMV obtained by the MPEG decoder 1. The obtained DCT parameter and the DMV parameter are input into the block distortion correction circuit 4, where a block distortion correction value representing the complexity of the image is calculated and the decoded image from the MPEG decoder 1 is corrected in accordance with this value to obtain the output image.

The block distortion correction value can be calculated in the block distortion correction circuit 4 by known art such as disclosed in WO98/54892. For example, when the DCT parameter and DMV parameter are large, the circuit judges that the complexity in decoding is high and controls the correction amount by setting the parameter representing the decoding complexity to a high value.

The DCT parameter extraction circuit 2 integrates the DCT coefficients for each predesignated area in a frame in accordance with the macroblock mode as shown in equations (1) to (3) and rounds off the result for each macroblock unit (for each addition of 16×16=256 pixels). Each macroblock unit is explained as being comprised of 256 pixels in the following example, however the invention can be similarly applied even in the case of 64 (=8×8) pixels.

In general, as macroblock modes (MB mode), there are the non-intra MB and intra MB mode. The non-intra MB mode is a mode in the case of encoding a predictive error signal obtained by obtaining a difference between image data of a macroblock and image data of a macroblock obtained by motion prediction from its reference frame and promises a high encoding efficiency when the temporal correlation of images is high. The intra MB mode is a mode where image data is encoded as it is without motion compensation prediction and is used in cases where temporal correlation cannot be expected due to large changes in scenes etc.

The following equations (1) to (3) are for calculating DCT parameters in the different macroblock modes:

Non-intra MB Mode $$DCT\_MB = (1/256) \times \Sigma |Di| + 0.5 \quad (1)$$

Intra MB Mode $$Pavg = (1/256) \times \Sigma |Di| + 0.5 \quad (2)$$

$$DCT\_MB = (1/256) \times \Sigma |Pavg - Di| + 0.5 \quad (3)$$

Here, Di is DCT coefficient luminance value for a luminance signal obtained by inverse DCT in the MPEG decoder 1. The DCT coefficient luminance value Di is input into the DCT parameter extraction circuit 2. DCT_MB is a DCT parameter in a macroblock used for block distortion reduction. Pavg is an absolute average of DCT coefficient luminance values Di calculated in case of the intra MB mode.

As clear from equations (1) to (3), for both the non-intra MB and intra MB mode, the obtained DCT parameter DCT_MB is an absolute average of DCT coefficient luminance values Di as differential values.

In general, in a macroblock where motion is intensive and complicated or in a macroblock including a high frequency component, the DCT coefficient and the differential motion vector DMV obtained by the MPEG decoder 1 become high. In a macroblock where motion is monotonous and gentle or in a macroblock with a small high frequency component, the DCT coefficient and the differential motion vector DMV obtained by the MPEG decoder 1 become low. Therefore, the DCT parameter DCT_MB obtained by equation (3) can be applied as the degree of complexity of the image data in the later block distortion correction circuit 4.

In case of the non-intra MB mode, as described above, the DCT coefficient luminance values Di are differential values, so a specific DCT coefficient luminance value Di is calculated as an average of differential values.

In case of the intra MB mode, the DCT coefficient luminance values Di are the luminance signals themselves and are not differential values, so Pavg is calculated as an average of the DCT coefficient luminance values Di in a macroblock in advance, then a DCT parameter DCT_MB is calculated as an average of the absolute values of the differences between the calculated Pavg and the DCT coefficient luminance values Di.

For both cases, after the average is calculated, the result is rounded off.

Figure 2:
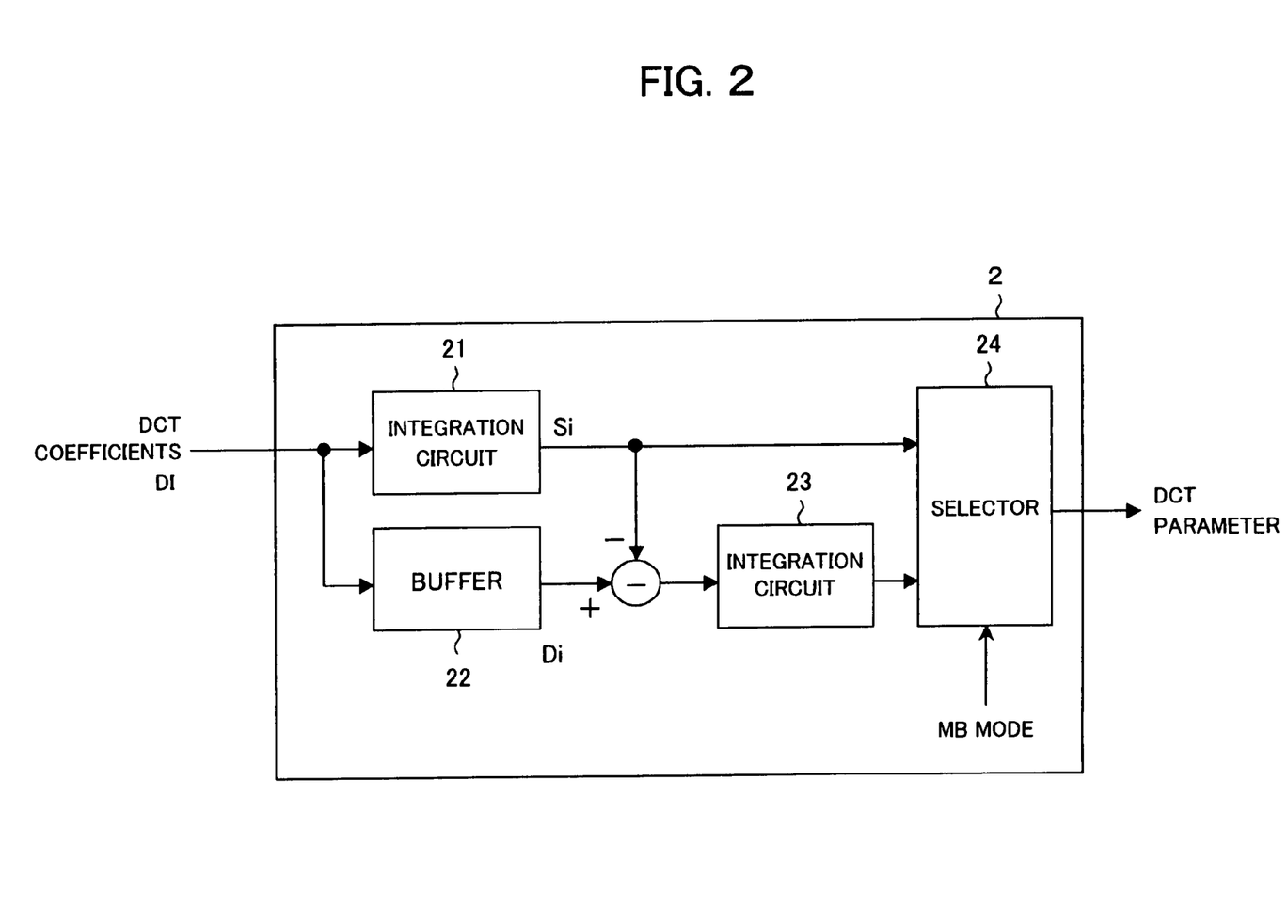
FIG. 2 is a block diagram of a DCT parameter extraction circuit for calculating a DCT parameter.

FIG. 2 is an embodiment of the DCT parameter extraction circuit 2 for calculating the DCT parameter DCT_MB in the block distortion reduction apparatus according to the present invention.

Here, the DCT parameter extraction circuit 2 has a integration circuit 21, a buffer 22, an integration circuit 23, and a selector 24 and is configured so that equations (1) to (3) can be calculated.

The integration circuit 21 reads DCT coefficient luminance values Di input in a macroblock unit, integrates the same and calculates an average of the DCT coefficient luminance values Di of the pixel units in the macroblock, and outputs this to the selector 24. The buffer 22 has a macroblock unit buffer capacity and sequentially buffers input DCT coefficient luminance values Di. The integration circuit 23 integrates the differences between the average of DCT coefficient luminance values Di of the pixel units in the macroblock which the integration circuit 21 outputs and the DCT coefficient luminance values Di of the macroblock unit which the buffer 22 has buffered and outputs the result to the selector 24. Of course the above operations are synchronized by a clock signal (not shown). The selector 24 outputs selectively a signal obtained by the integration circuit 21 or the integration circuit 23 as a DCT parameter.

Here, in case of the non-intra MB mode, as shown in equation (1), since the DCT parameter DCT_MB is calculated by averaging the input DCT coefficient luminance values Di as they are, the output of the integration circuit 21 corresponds to the DCT parameter DCT_MB. In the case of the intra MB mode, as shown in equations (2) and (3), the average luminance value Pavg must be calculated first, then the DCT parameter DCT_MB calculated.

Therefore, the DCT parameter extraction circuit 2, in case of the intra MB mode, calculates the average luminance value Pavg in the integration circuit 21, then integrates, in the integration circuit 23, the differences between the DCT coefficient luminance values Di buffered in the buffer 22 and the average luminance value Pavg calculated in the integration circuit 21, and averages the same to obtain the DCT parameter DCT_MB.

The results are rounded off in the integration circuit 21 and the integration circuit 23 after calculation of the averages.

As clear from equations (2) and (3), the two integration operations performed in the DCT parameter extraction circuit only differ in input values, so similar circuits can be used for both the integration circuit 21 and the integration circuit 23. Further, the buffer 22 only requires a capacity corresponding to one macroblock's worth of DCT coefficient luminance values Di when processing DCT coefficient luminance values Di obtained from the MPEG decoder 1.

Equation (1) can be further rewritten as follows:

$$IDC\_MB = (1/256) \times (\Sigma |Di| + 128) \qquad (4)$$

According to equation (4), the number of calculations for each macroblock can be reduced by giving a rounded off value (128 in the above example) as initial values of the integration operations in the integration circuit 21 and the integration circuit 23 instead of rounding off after finding the average.

Figure 3:
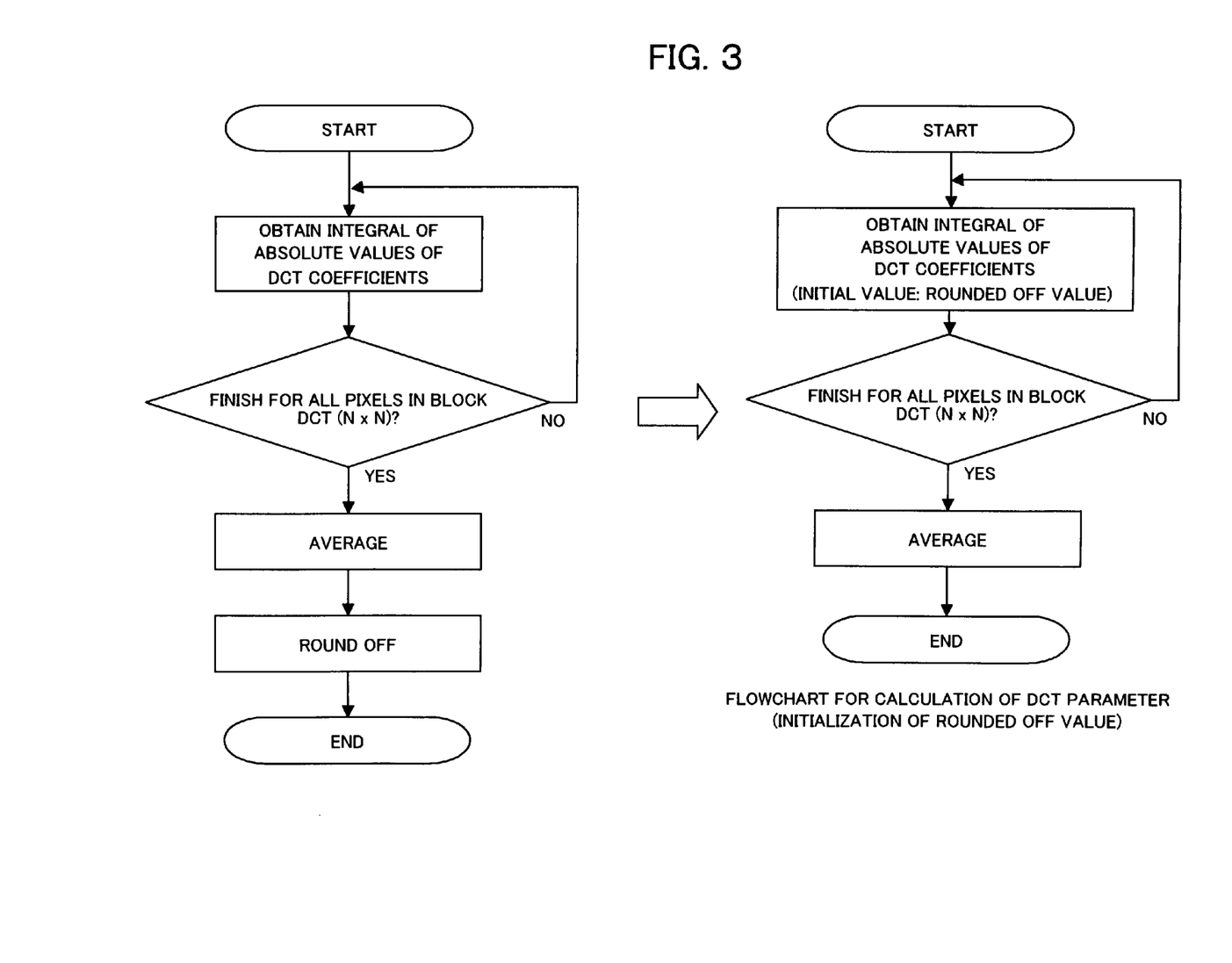
FIG. 3 is a flowchart for calculation of a DCT parameter.

FIG. 3 is a flowchart showing the initialization of the above rounded off value.

Next, the calculation of the DMV parameter DMV_MB will be described.

As explained above, in general, in a macroblock where motion is intensive and complicated or in a macroblock including a high frequency component, the DCT coefficient and the differential motion vector DMV obtained by the MPEG decoder 1 become high. In a macroblock where motion is monotonous and gentle or in a macroblock with a small high frequency component, the DCT coefficient and the differential motion vector DMV obtained by the MPEG decoder 1 become low. Therefore, the DCT parameter DCT_MB obtained by equation (3) can be applied as the degree of complexity of the image data in the later block distortion correction circuit 4.

Figure 4:
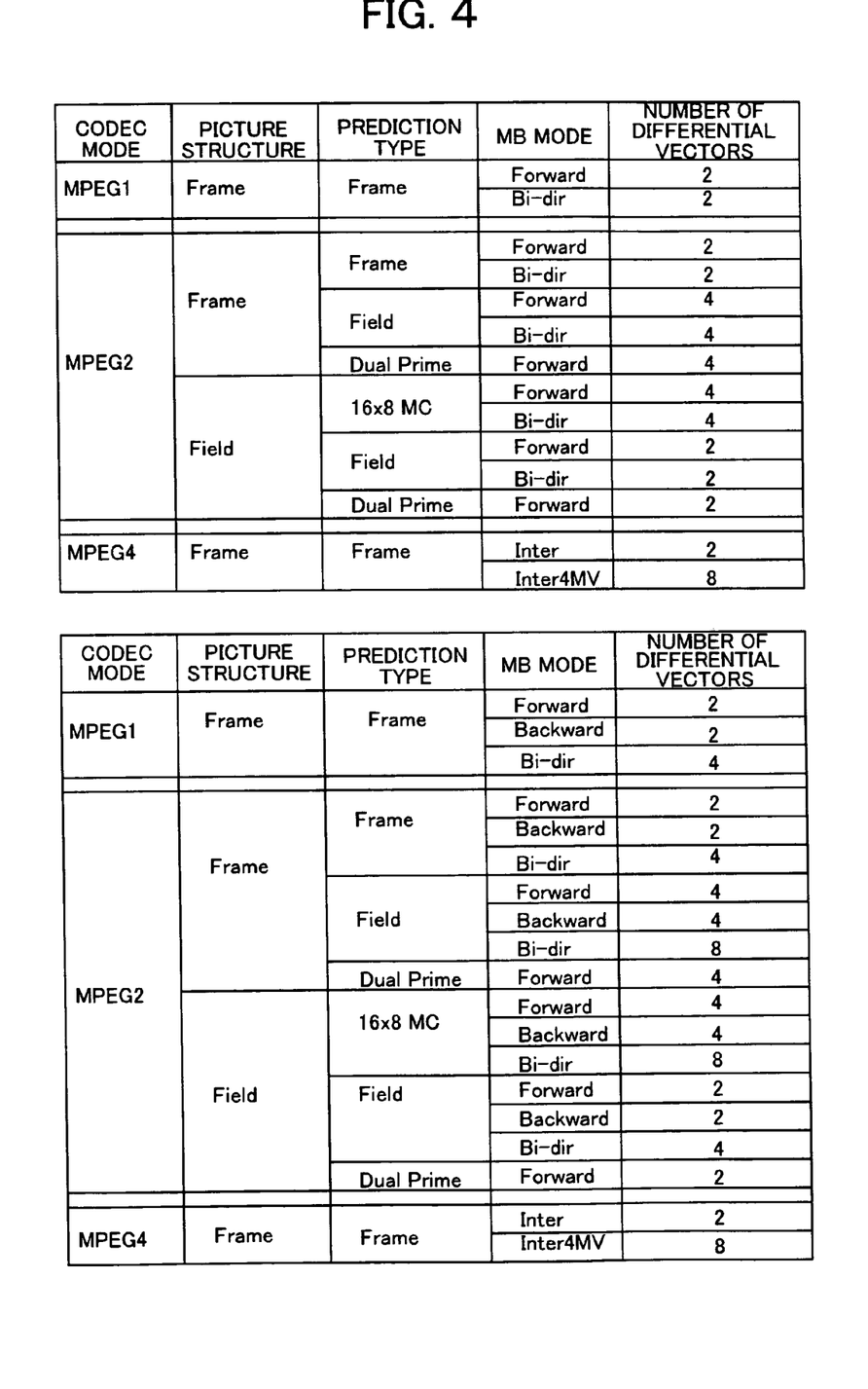
FIG. 4 is a view of the relationship among the MPEG codec mode, picture structure, prediction type, macroblock (MB) mode, and number of differential motion vectors.

FIG. 4 is a view summarizing in a tabular form the various cases where the number of differential motion vectors DMV differ in accordance with the MPEG codec mode, picture structure, prediction type, and macroblock (MB) mode. As shown in FIG. 4, depending on the codec mode etc., there are two to eight differential motion vectors, so if performing integration operations for each codec mode etc., a corresponding number of integration circuits would be required. This is not desirable from the viewpoint of the circuit size.

Therefore, in the present embodiment, the integral of the maximum eight differential motion vectors DMV is found for each predesignated area in a frame as shown in the following equation:

$$SUM\_DMV = |DMV0| + |DMV1| + |DMV2| + |DMV3| + |DMV4| + |DMV5| + |DMV6| + |DMV7| \qquad (5)$$

$$DMV\_MB = SUM\_DMV * Weight \qquad (6)$$

As clear from equation (5), the calculation is performed assuming there are always eight differential motion vectors DMV. Further, as described above, since there are also cases where there are only two differential motion vectors DMV depending on the codec mode, picture structure, prediction type, and macroblock mode, weighting is performed, as shown by equation (6), in accordance with the number of the differential motion vectors DMV.

Figure 5:
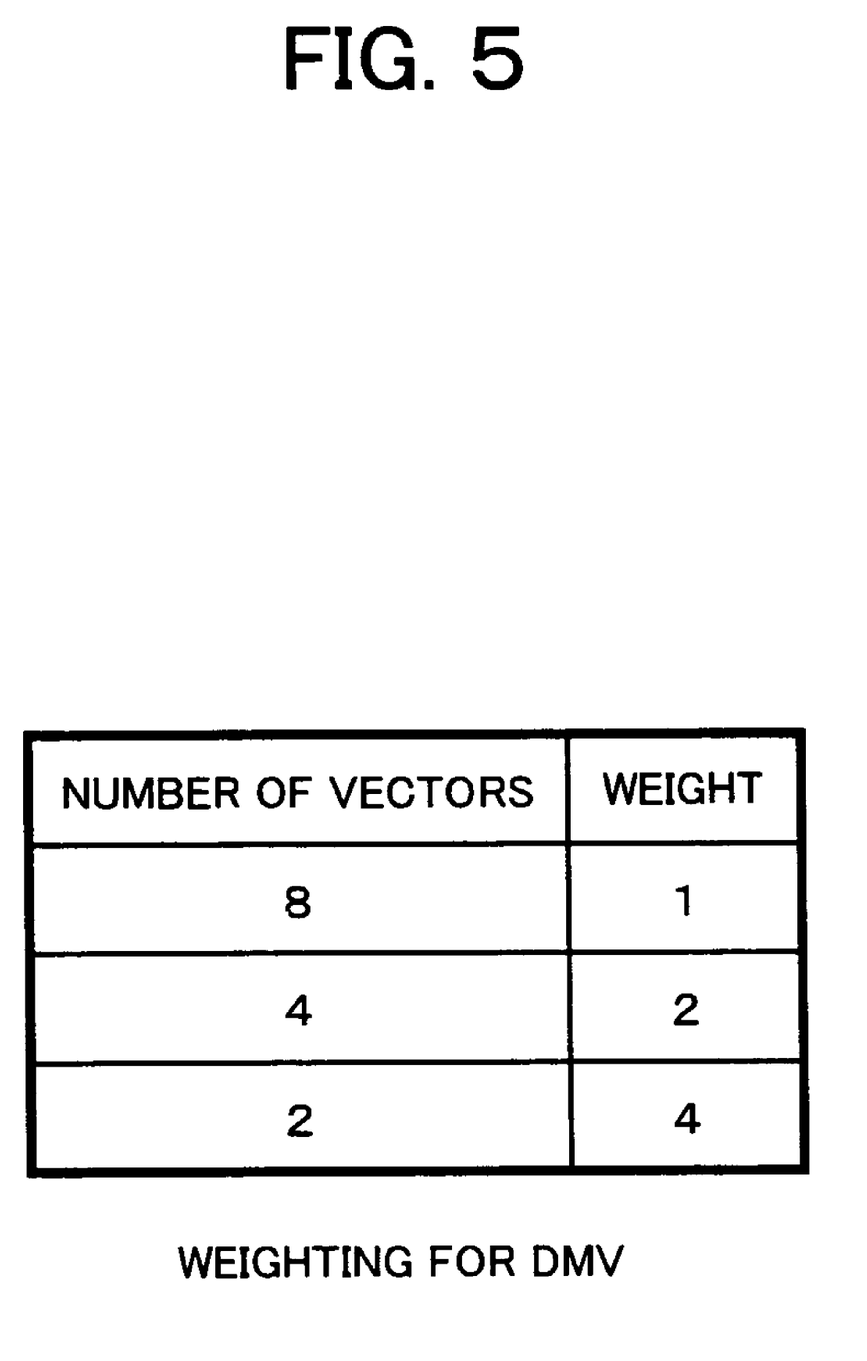
FIG. 5 is a view of the relationship between a number of differential motion vectors and weighting.

As the method of weighting, as shown in FIG. 5, in the case of the MPEG4-Frame-Frame-Inter4MV, since there are the maximum eight vectors, the weight of that case is defined as "1" and the weights for the other cases are decided accordingly.

FIG. 5 is a view showing the weights of the other cases when the case of MPEG4-Frame-Frame-Inter4MV is defined as "1". By setting the weights in this way, even if there are only two differential motion vectors DMV, it becomes possible to perform an integration operation as if there were eight vectors. By calculating as if there were eight vectors, it becomes possible to calculate the DMV parameter DMV_MB, independent of the codec mode etc., in a single integration circuit 31.

Figure 6:
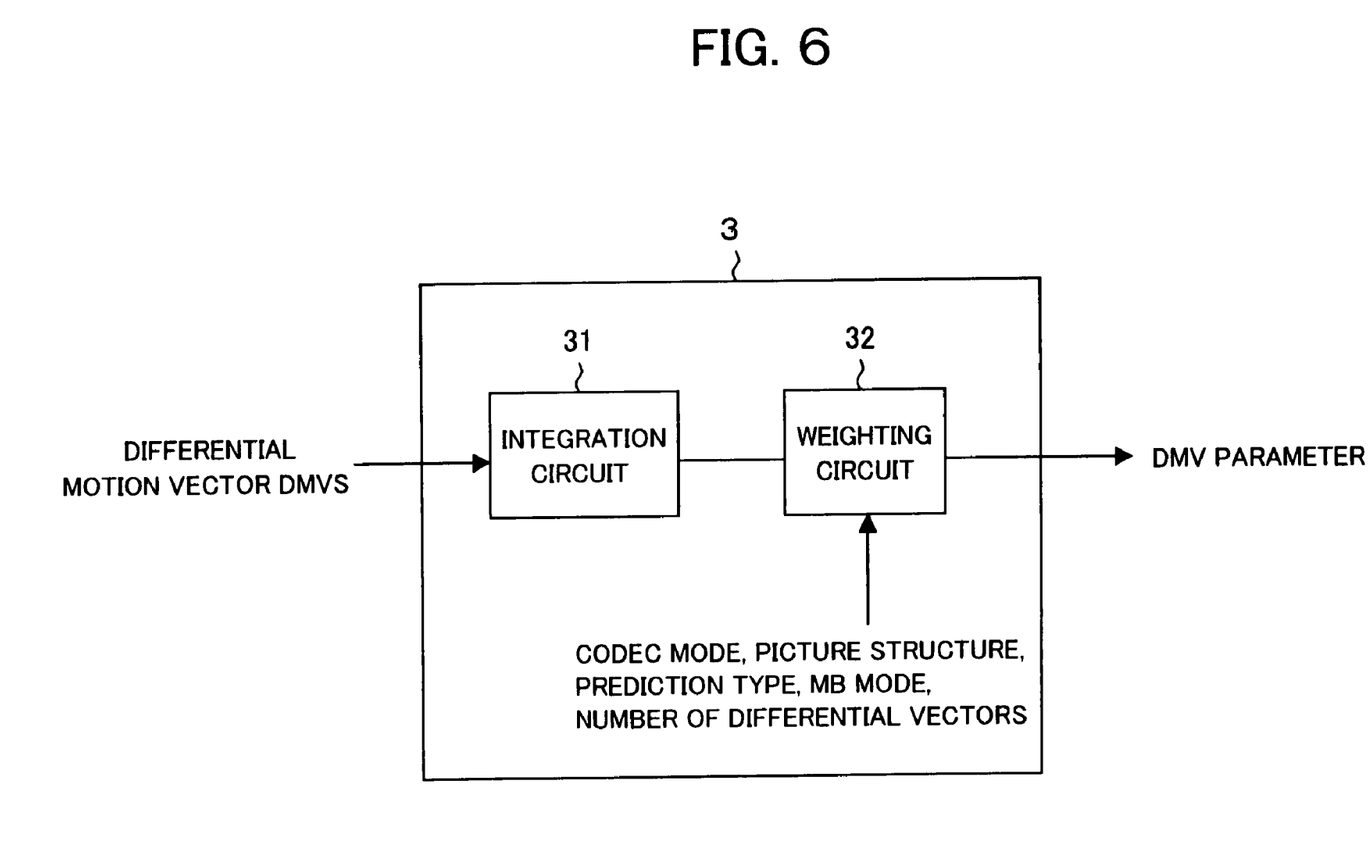
FIG. 6 is a block diagram of a DMV parameter extraction circuit for calculating a DMV parameter.

FIG. 6 is a block diagram of a DMV parameter extraction circuit 3 for calculating a DMV parameter based on the above mentioned calculation method.

The DMV parameter extraction circuit 3 has an integration circuit 31 and a weighting circuit 32. It calculates an integral of the differential motion vectors DMV obtained by the MPEG decoder 1 in accordance with the MPEG codec mode, picture structure, prediction type, and macroblock (MB) mode.

In the DMV parameter extraction circuit 3, the weighting circuit 32 is given a mode assignment (MPEG codec mode, picture structure, prediction type, and macroblock mode) from outside (not shown), weights the integral of the differential motion vectors DMV according to the assigned mode, and outputs the resultant DMV parameter.

As described above, the DMV parameter extraction circuit 3 performs addition by block units and weighting in accordance with the MPEG codec mode, picture structure, prediction type, and macroblock mode while setting a weight to 1 in case where the maximum eight vectors are valid. Therefore, it becomes possible to calculate the parameter independent of the codec mode etc. with a small-sized circuit configuration.

The DCT parameter DCT_MB and DMV parameter DMV_MB calculated for each macroblock are calculated by assigning any area in a frame as a target area for block distortion judgment.

Figure 7:
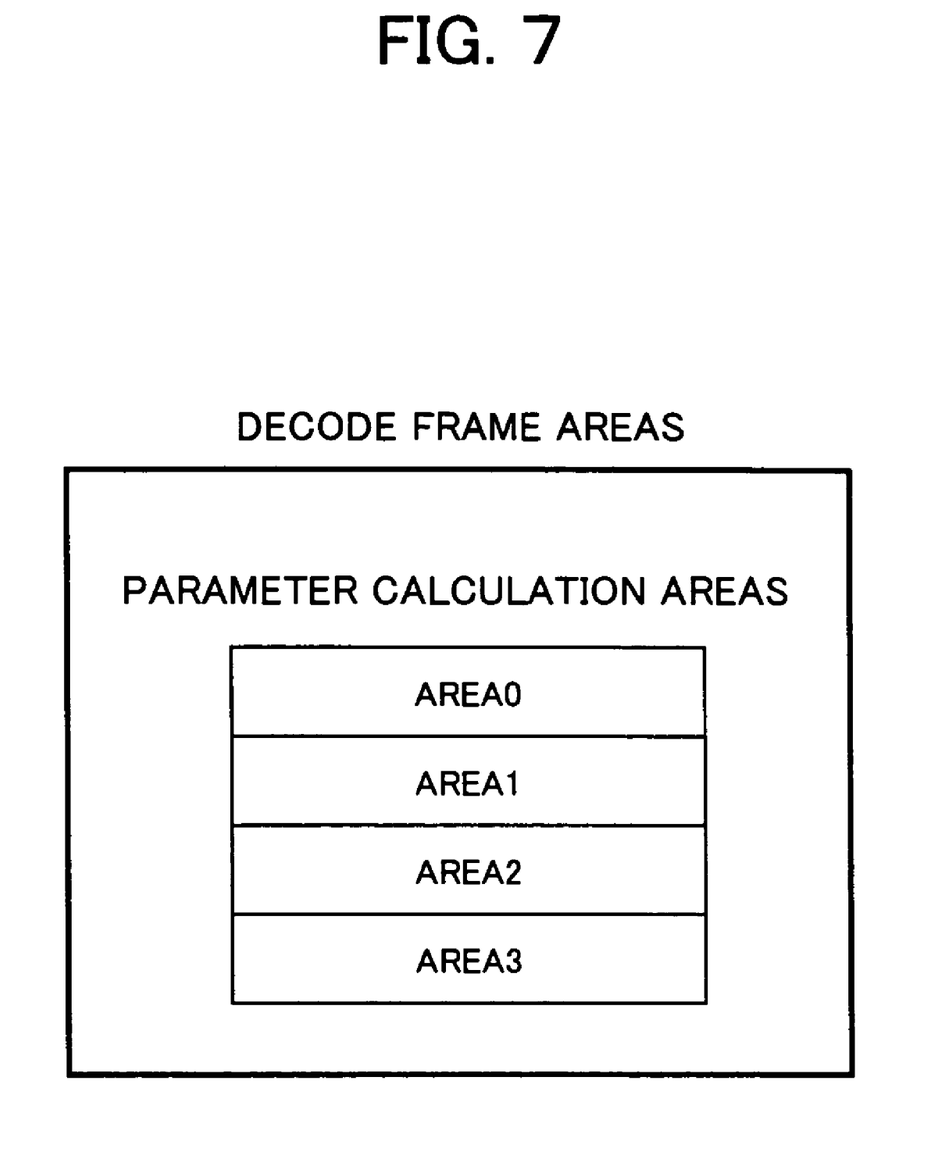
FIG. 7 is a flowchart for calculation of a DMV parameter.

FIG. 7 is a view of a case where any area in a frame is divided into, for example, four. In FIG. 7, DCT parameters DCT_MB and DMV parameters DMV_MB for four areas AREA0 to AREA3 are obtained by calculating DCT parameters DCT_MB and DMV parameters DMV_MB by macroblock for the plurality of macroblocks belonging to each area and finding the integrals of the same.

Below, a case where a parameter is calculated for a certain area, taking as an example a DMV parameter, will be described.

Figure 8:
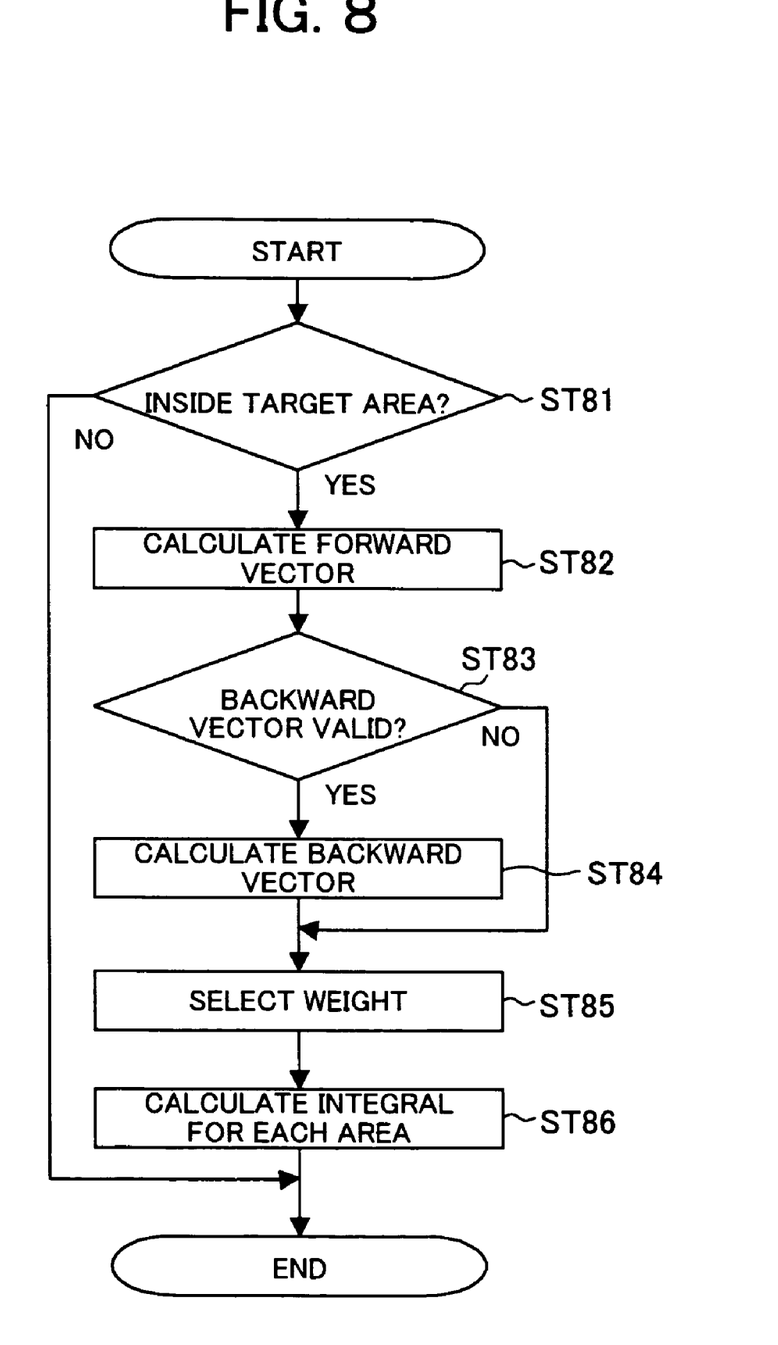
FIG. 8 is a view for explaining a parameter calculation area.

FIG. 8 is a flowchart for calculating a DMV parameter for a certain area.

In FIG. 8, it is first judged whether the area is a target area for block distortion reduction or a certain area of the above four areas for example (ST81). If it is not a target area, the DMV parameter is not calculated. If it is a target area, a forward vector is calculated (ST82) and, if the backward vector would be valid, a backward vector is calculated (ST84).

Next, based on the relationship between the number of differential motion vectors DMV and weights in FIG. 6, a weight is selected (ST85). Finally, the DMV parameter for the specific area is found by integrating the DMV parameters for each macroblock (ST86).

The number of areas divided into is not limited to the above four and may be any number. If there is at least one macroblock in each area, the DCT parameter DCT_MB and DMV parameter DMV_MB for each area can be calculated.

Figure 9:
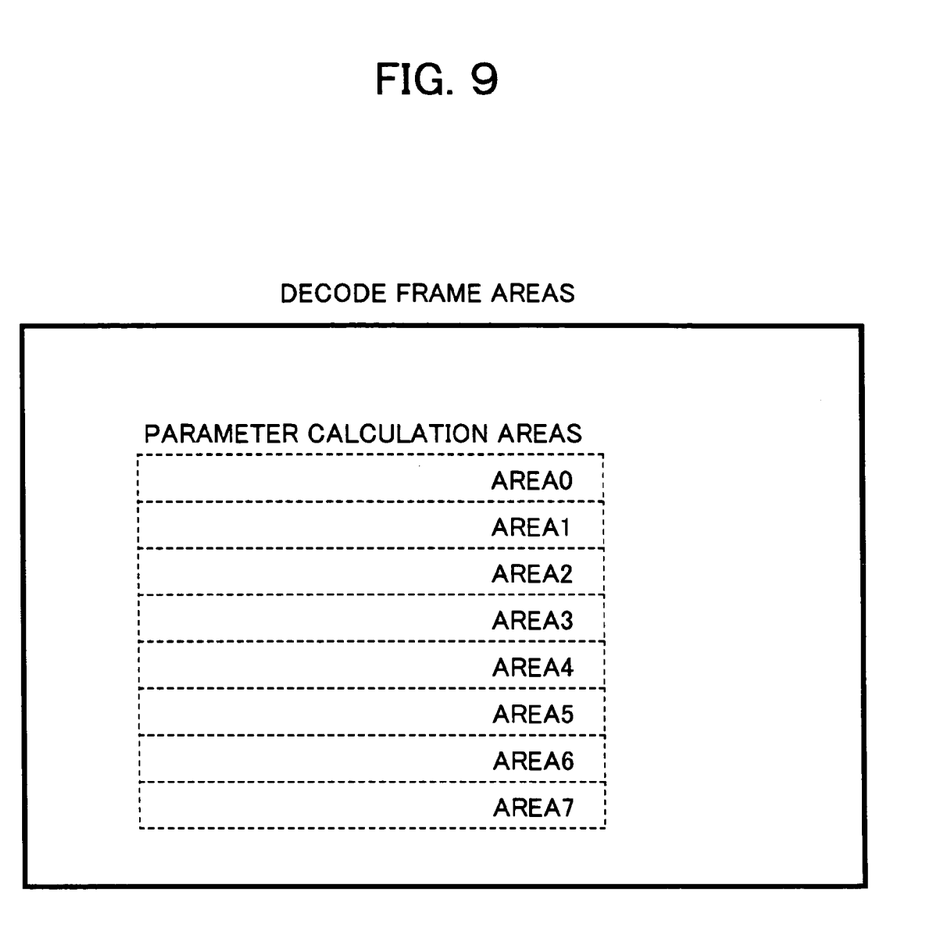
FIG. 9 is a view for explaining a parameter calculation area.

FIG. 9 is a view for explaining a case where an area is divided into smaller areas.

If calculating the parameters for smaller areas as shown in FIG. 9, since the number of macroblocks in an area becomes relatively small, discontinuity in the DCT parameters DCT_MB and DMV parameters DMV_MB calculated for the areas AREA0 to AREA7 may occur.

Figure 10:
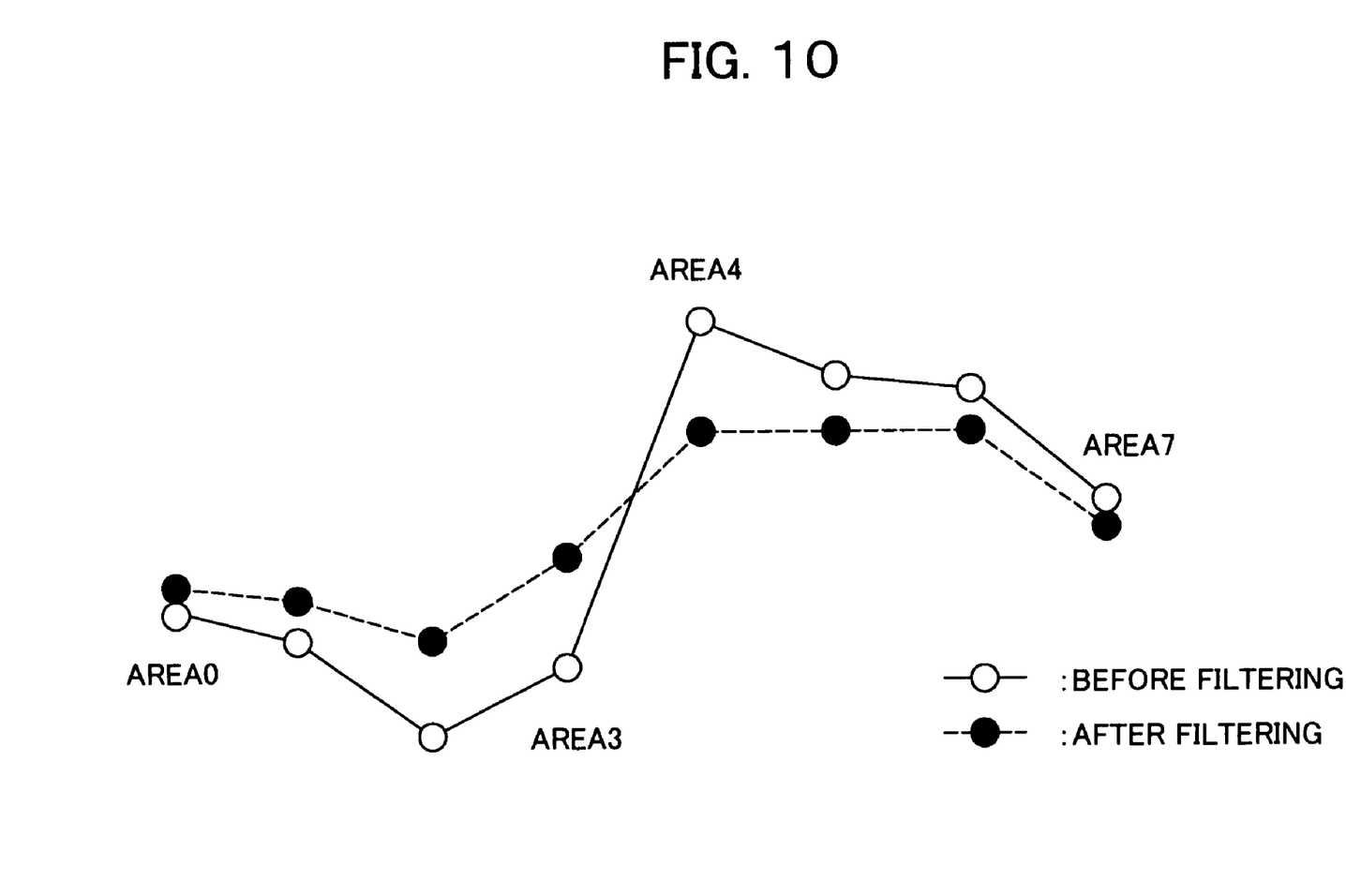
FIG. 10 is a view for explaining filtering of parameters.

In this case, as shown in FIG. 10, it is possible to reduce the discontinuity by filtering the obtained parameters. In FIG. 10, if discontinuity occurs at the boundary between AREA3 and AREA4 in FIG. 9, filtering is performed near that boundary.

As the filtering method, a variety of related art can be applied as disclosed in WO98/54892.

As described above, even if setting the target areas for block distortion reduction small, it is possible to reduce discontinuity in areas including boundaries and thus eliminate block distortion effectively.

As described above, according to the block distortion reduction apparatus of the present embodiment, since the areas for reducing block distortion are designated and just as little as macroblock's worth of parameters needs to be calculated for each area, the buffer is needed only for one macroblock in capacity and the processing is easy. Further, since parameters are extracted for each designated area, adaptive control in area units becomes possible and the performance for block distortion reduction can be improved.

Further, according to the block distortion reduction apparatus of the present embodiment, since the DCT parameter extraction circuit 2 uses a similar integration circuit 21 and integration circuit 23, gives initial values for rounding off to the integration circuit 21 and integration circuit 23, and can output a parameter DCT_MB for both the intra MB mode and non-intra MB mode as needed, it becomes possible to reduce the circuit size and number of calculations compared with a block distortion reduction apparatus of the related art.

Further, since in the DMV parameter extraction circuit 3 integrates the plurality of differential motion vectors output from the MPEG decoder while weighting in accordance with the encoding mode, a single integration circuit is sufficient for a plurality of the encoding modes. Therefore, it becomes possible to reduce the circuit size and number of calculations compared with a block distortion reduction apparatus of the related art.

Since the above calculation is performed for each macroblock, the buffer in each circuit just requires one macroblock's worth of capacity and can be used as it is when calculating the DCT parameter and DMV parameter for any area. Therefore, it becomes possible to further reduce the circuit size.

The present invention is not limited to the above embodiment and may be modified in various ways within the scope of the gist of the present invention.

For example, in the above embodiment, the DCT parameter extraction circuit 2 calculated the DCT parameters based on the DCT coefficient luminance values, however it may be similarly used for color difference components.

Further, in the present embodiment, the DMV parameter extraction circuit 3 performed the weighting assuming eight differential motion vectors at the maximum, however the number of the differential motion vectors is not limited to eight. A larger number of differential motion vectors may be used as well. In this case, the weight for each encoding mode may be set based on that maximum number of differential motion vectors.

What is claimed is:

1. A block distortion reduction apparatus for reducing block distortion occurring when decoding an image in macroblock units, comprising:
    an encoding coefficient averaging means for calculating a first average and a second average, both averages determined from all decoded coefficient luminance values in a macroblock, wherein said encoding coefficient averaging means includes two identical circuits that perform numerical integration for calculating the first and second averages;
    an encoding selecting means for selecting one macroblock mode of an intra-mode and a non-intra-mode; and
    a block distortion correcting means for correcting block distortion of the decoded image by using either the first average determined from the decoded coefficient luminance values or the second average determined from the decoded coefficient luminance values, in accordance with the selected macroblock mode.

2. The block distortion reduction apparatus as set forth in claim 1, further comprising a filtering means for filtering the first average or the second average for the selected macroblock mode.

3. The block distortion reduction apparatus as set forth in claim 1, further comprising:
    a differential vector integrating means for integrating differential vectors in a macroblock obtained by decoding said image; and
    a weighting means for weighting the integration result of the differential vector integrating means in accordance with the encoding mode of said image; wherein
    the block distortion correcting means corrects block distortion of the decoded image by the integration result weighted by the weighting means.

4. A block distortion reduction method implemented by a computer configured as a block distortion reduction apparatus for reducing block distortion occurring when decoding an image in macroblock units, comprising:
    calculating, by two identical circuits that perform numerical integration, a first average and a second average, both averages determined from all decoded coefficient luminance values in a macroblock;
    selecting one macroblock mode of an intra-mode and an non-intra-mode; and
    correcting block distortion of the decoded image by using either the first average determined from the decoded coefficient luminance values or the second average determined from the decoded coefficient luminance values, in accordance with the selected macroblock mode.

5. A block distortion reduction apparatus for reducing block distortion occurring when decoding an image in macroblock units, comprising:

an encoding coefficient averaging means for calculating a first average and a second average, both averages determined from all decoded coefficients in a macroblock;

an encoding selecting means for selecting one macroblock mode of an intra-mode and a non-intra-mode; and a block distortion correcting means for correcting block distortion of the decoded image by using either the first average of the decoded coefficients or the second average of the decoded coefficients, in accordance with the selected macroblock mode, wherein said encoding coefficient averaging means includes two identical circuits that perform numerical integration for calculating the first and second averages.

\* \* \* \* \*